No. 869,516. PATENTED OCT. 29, 1907.
H. A. POWERS.
HEADING MACHINE.
APPLICATION FILED FEB. 13, 1907.
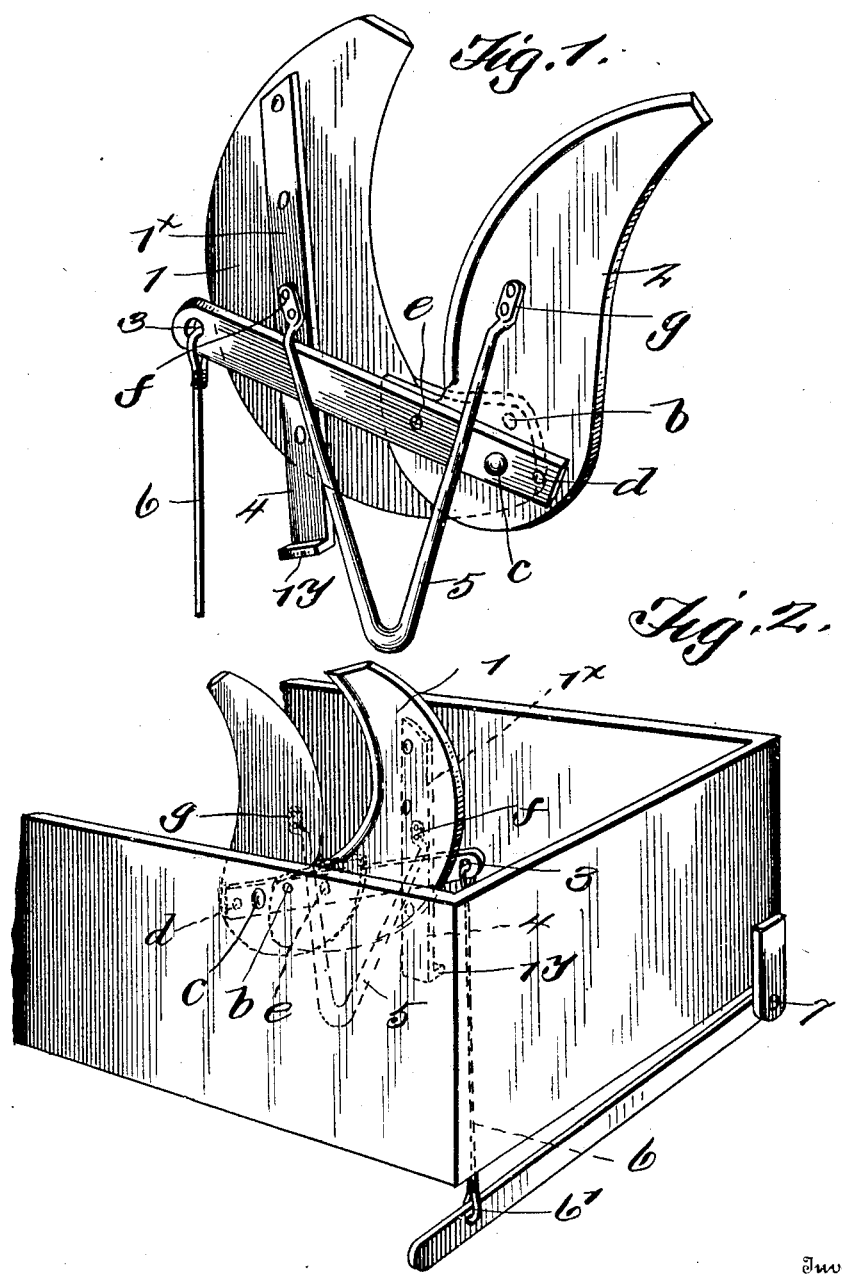
Witnesses
R. H. Boswell
A. P. Hough
Inventor
Hines Alonzo Powers
By Franklin H. Hough
Attorney

UNITED STATES PATENT OFFICE.

HINES ALONZO POWERS, OF FARRY, OKLAHOMA TERRITORY.

HEADING-MACHINE.

No. 869,516.  Specification of Letters Patent.  Patented Oct. 29, 1907.

Application filed February 13, 1907. Serial No. 357,231.

*To all whom it may concern:*

Be it known that I, HINES ALONZO POWERS, a citizen of Farry, in the county of Woodward and Territory of Oklahoma, have invented a new and useful Heading-Machine, of which the following is a specification.

This invention relates to new and useful improvements in devices for heading Kafir corn, and consists essentially in the provision of a simple and efficient device of this nature designed to be attached to a wagon box and actuated by lever mechanism whereby two shearing blades are brought together.

The invention consists in various details of construction and arrangements of parts which will be hereinafter fully described and then specifically defined in the appended claim.

I illustrate my invention in the accompanying drawings, in which:—

Figure 1 is a perspective view of my heading device detached from a wagon box, and Fig. 2 is a perspective view showing the same applied to the box.

Reference now being had to the details of the drawings by letters and numerals, 1 designates a stationary concaved blade which is adapted to be bolted to the wagon box in the manner shown in Fig. 2 of the drawings. Fixed to said blade 1 is a bar $1^x$, the lower end of which is bent at an angle as at $1^y$ and adapted to serve as a stop. Said bar also serves as a brace to reinforce the blade 1 and is bolted or otherwise fixed thereto.

2 designates a pivotal blade having a convexed cutting edge and mounted upon the pivot C which also serves as a means to hold the stationary cutting blade to the wagon box.

5 designates a V-shaped spring, one end of which is fastened at $f$ to the bar $1^x$ and its other end fastened at $g$ to the pivotal blade 2. The fixed or stationary blade 1 is further reinforced and held to the box by means of the rivets $b$.

3 designates a bar which is fastened by the rivets $c$ and $d$ to the pivotal blade 2, and 6 designates a cord fastened to the free end of said bar 3 and is provided with a stirrup $6'$ at its end adapted to be secured to the pivotal lever 7, shown clearly in Fig. 2 of the drawings. Said bar 3 is so positioned that when it is depressed, its lower movement will be limited by the outwardly turned end $1^y$ of the bar $1^x$ and returned to its normal position by means of said spring 5.

The operation of my invention will be readily understood and is as follows. The Kafir corn to be headed, is placed between the blades and the operator, by pulling down upon the free end of the lever 7, will cause the pivotal blade to shear against the concaved stationary blade and sever the tops, the spring returning the pivotal blade to its normal position.

What I claim is:—

A device for heading Kafir corn comprising a stationary blade means for fastening the same to a wagon box, a pivotal blade mounted to shear against the stationary blade, a bar fixed to said stationary blade and provided with a projection serving as a stop, a V-shaped spring fastened at one end to said bar and at its other end to the pivotal blade, a bar fixed to the pivotal blade and adapted to contact with said projection to limit the movement of said pivotal blade in one direction, a lever, and connections between the same and the bar which is fixed to the pivotal blade for operating the latter, as set forth.

In testimony whereof I affix my signature in the presence of two witnesses.

HINES ALONZO POWERS.

Witnesses:
HARRY T. PARSONS,
J. J. SLASER.